Aug. 26, 1947.　　　J. W. DOWNIE　　　2,426,440
AIRCRAFT LANDING SYSTEM
Filed July 19, 1943　　　4 Sheets-Sheet 1

Inventor:
John W. Downie,
by Harry E. Dunham
His Attorney.

Aug. 26, 1947.      J. W. DOWNIE      2,426,440
AIRCRAFT LANDING SYSTEM
Filed July 19, 1943      4 Sheets-Sheet 3
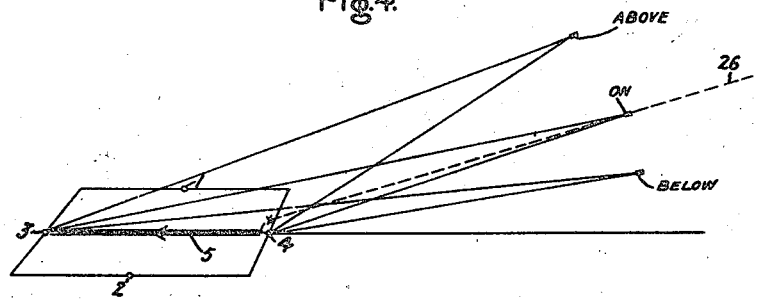
Fig. 4.
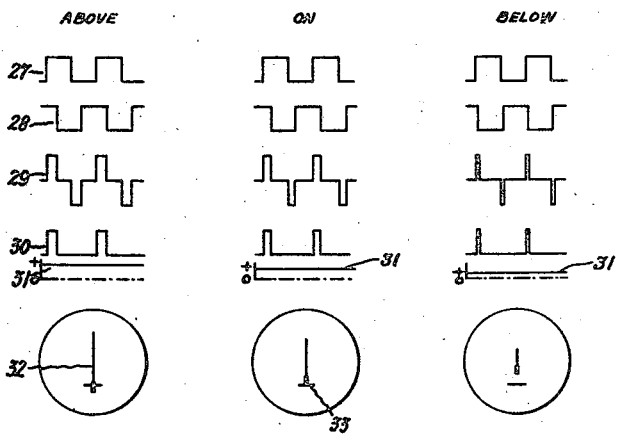
Inventor:
John W. Downie,
by Henry E. Dunham
His Attorney.

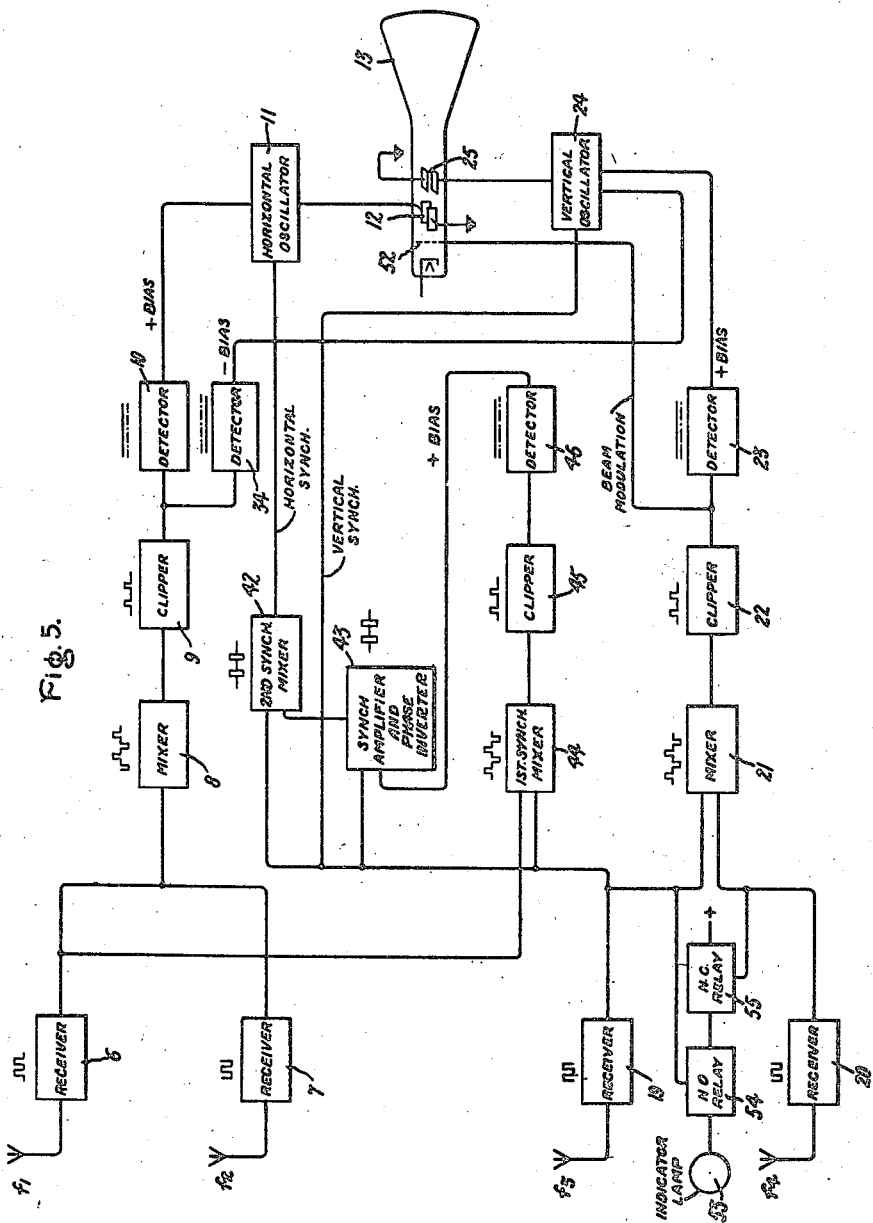

Patented Aug. 26, 1947

2,426,440

UNITED STATES PATENT OFFICE 2,426,440

AIRCRAFT LANDING SYSTEM

John W. Downie, Schenectady, N. Y., assignor to General Electric Company, a corporation of New York Application July 19, 1943, Serial No. 495,295

17 Claims. (Cl. 250—11)

1

The present invention relates to an aircraft landing system utilizing radio apparatus for producing a perspective representation of a runway, such representation varying in orientation and length respectively in accordance with the angles in azimuth and elevation between the runway and the line of sight from an approaching aircraft to a point on the runway. Since the length of the representation of the runway, when the aircraft is properly oriented in azimuth, depends on the elevation angle rather than on both the elevation angle and the distance from the aircraft to the runway, as in a true perspective, the apparent length of the runway is a measure of the glide angle at which the aircraft would approach the runway if the glide were started from the point of observation.

By continuing level flight until the representation of the runway has the proper orientation and length and thereafter adjusting the flight angle to maintain the length of the representation at this value, the aircraft can be brought within landing distance along the proper glide path independent of the height or distance from which the glide is started.

The object of my invention is to provide an improved aircraft landing system having radio apparatus substantially unaffected by signal strength for producing a representation of the position of the runway to guide the landing of aircraft under conditions in which normal vision is inadequate.

Figure 1:
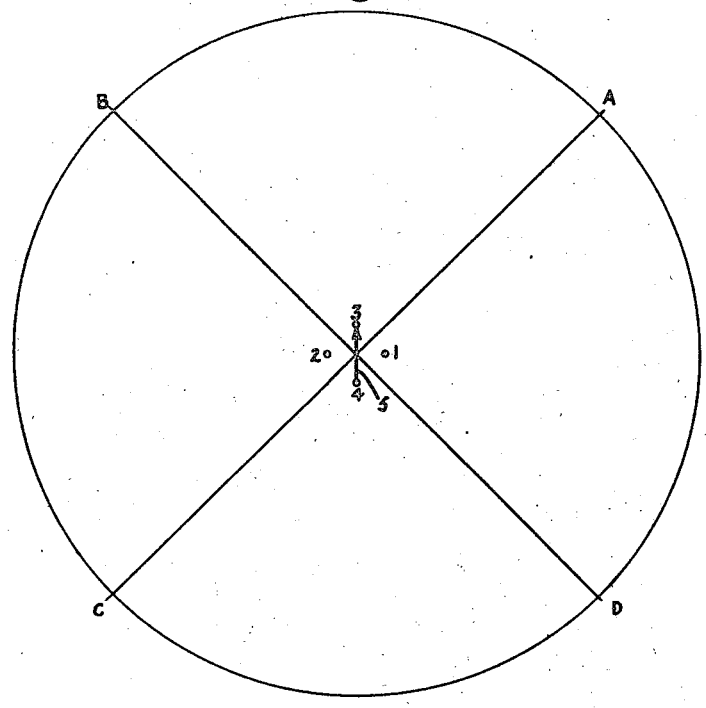
Figure 2:
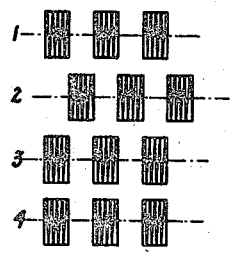
Figure 3:
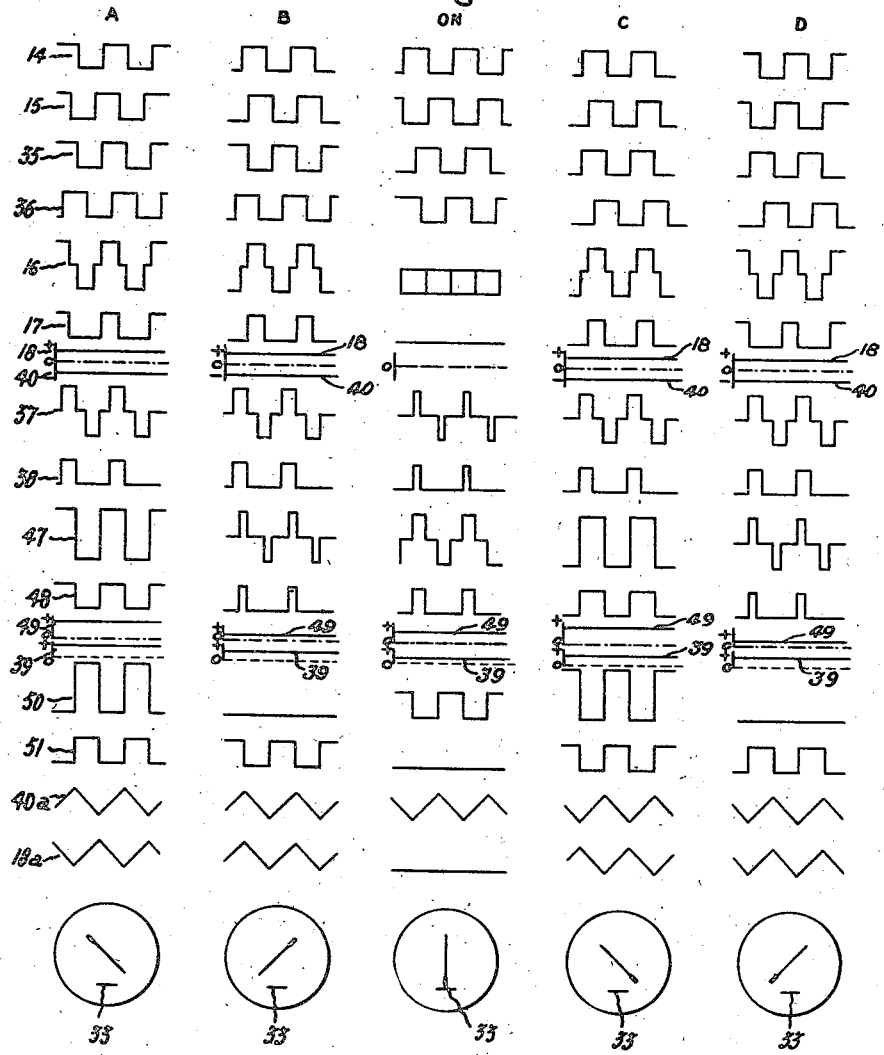

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a top plan view of a runway and the radio beacons; Fig. 2 represents the envelope of the radio waves transmitted by the beacons; Fig. 3 illustrates the manner in which the signals from the beacons are used to determine the relative position of the runway; Fig. 4 illustrates the manner in which the signals are used to determine the glide angle; and Fig. 5 is a diagram of the apparatus carried by the aircraft.

Referring to Fig. 1, 1 and 2 represent beacons arranged respectively at the right and left of the center of a runway 5 as viewed from an aircraft approaching from the proper direction for landing and 3 and 4 represent beacons arranged respectively at the far and near ends of the

2 runway. Each of the beacons is an antenna which radiates uniformly in all directions with a cone of silence directly above. The beacons are respectively connected to transmitting units having carrier frequencies $f1$, $f2$, $f3$, and $f4$ and modulated at identical frequencies with square wave pulses recurring at a frequency substantially equal to the inverse of twice the time of travel of radio waves through the distance the beacons are spaced. In other words, the distance between the beacons 1, 2 and 3, 4 of each pair is substantially one-half wavelength at the modulation frequency. The envelopes of the modulated carrier waves from the four beacons are illustrated in Fig. 2 on a common time base. Referring particularly to beacons 3 and 4, since the groups of pulses from 3 and 4 are of fifty per cent width as illustrated in Fig. 2, the signal from beacon 3 arriving at beacon 4 is changed in phase 180 degrees. In other words, the spacing of the beacons is such that the time of travel between them is equal to the pulse width of the modulating frequency. It is not necessary that the time of travel be exactly equal to the pulse width. If it is greater (corresponding to greater spacing), there will be ambiguity, and if less, there will be a smaller change in relative phase of the signals arriving at the aircraft.

The phase of the signals transmitted from the beacons is shown in Fig. 2. The signals arrive at an approaching aircraft with a change in relative phase proportional to the difference in distances from the aircraft to the respective beacons. This change in phase varies with the position of the approaching aircraft and accordingly can be used to determine the position of the aircraft relative to the runway.

The amount the approaching aircraft is off line (the angle in azimuth between the runway and a line of sight from the aircraft to the runway) is determined by the signals from beacons 1 and 2. In the plane of beacons 3 and 4 (a median plane perpendicular to the plane of beacons 1 and 2 and in line with the runway) the signals from beacons 1 and 2 arrive in unchanged relative phase since all points in this plane are equidistant from the beacons. On either side of this plane, the relative phase is changed by the difference in the distances to the respective beacons and the change in relative phase is accordingly a measure of the amount the approaching aircraft is off line of the runway.

In the present apparatus, the signals from beacons 1 and 2 are received at the approaching aircraft by non-directional receivers 6 and 7

(Fig. 5) in each of which the signals are amplified, detected, and clipped to produce an output of constant amplitude which is unaffected by variations in the signal intensity and accordingly, within the operating range of the apparatus, is independent of the distance to the approaching aircraft. The output of the receivers 6 and 7 is fed through a mixer 8 in which the signals are added, a clipper 9 in which the lower half of the mixed signals is removed, and a detector 10 in which the output of the clipper is integrated to produce a positive bias for a horizontal sweep-circuit oscillator 11 connected to the horizontal plates 12 of a cathode ray tube 13. The horizontal oscillator is arranged to produce oscillations having zero amplitude at zero bias and to have amplitude proportional to the positive bias applied from the detector 10. When the aircraft is in line with the runway, the signals from the beacons 1 and 2 are exactly out of phase and there is no horizontal deflection of the beam of the cathode ray tube. At other points there is an in-phase component dependent upon the angle the aircraft is off line of the runway which controls the amplitude of the oscillations produced by the horizontal oscillator (the amount of horizontal deflection of the beam).

The manner in which the off-line indication varies is illustrated in Fig. 3. for off-line points A, B, C, and D of Fig. 1 and for the plane of the runway (labelled "On") in which the aircraft is in line with the runway. Lines 14 and 15 represent the outputs of receivers 6 and 7; line 16 represents the output of the mixer 8; line 17 represents the output of the clipper 9; line 18 represents the output of the detector 10; and line 18a represents the voltage of the horizontal oscillator 11.

The accuracy of the off-line indication depends in part on the adjustment of the clippers. The accuracy of the off-line indication also varies with the spacing of the beacons 1 and 2 which can be considered as a base line. The maximum accuracy is obtained by spacing the beacons 1 and 2 a pulse width apart (in signal travel time) so that there will be a 180 degree change in the relative phase of the signals from beacons 1 and 2 at 90 degrees off line. The accuracy decreases with smaller spacing and greater spacing causes ambiguity in the indication.

The elevation of the aircraft is determined by the signals from beacons 3 and 4 modified, when the aircraft is off line, by the signals from beacons 1 and 2. The signals from beacons 3 and 4 are received by receivers 19 and 20 (Fig. 5) in which the signals are amplified, detected, and clipped as in receivers 6 and 7. The output of the receivers is fed through a mixer 21 which adds the signals, a clipper 22 which removes the lower half of the mixed signals, and a detector 23 which integrates the clipper output to obtain a positive bias controlling the amplitude of a vertical sweep circuit oscillator 24 connected to the vertical plates 25 of the cathode ray tube 13. In the plane of the runway the positive bias, and consequently the amplitude of oscillation produced by the vertical oscillator, depends on the relative phase of the signal output of the receivers 19 and 20 which varies with the angle of elevation of the aircraft, as shown in Fig. 4. The signals leave the beacons 3 and 4 in phase but since the beacons are spaced 180 degrees apart, at ground level in line with the runway the signals are received exactly out of phase and accordingly no net signal passes through the clipper 22. At a point directly over the center of the runway the signals from beacons 3 and 4 arrive in unchanged relative phase and a maximum signal passes through the clipper. It has been found that in the plane of the runway a path of constant difference in distance from the beacons 3 and 4 (and accordingly a path of constant difference in phase of the signals arriving at the aircraft) is a path of substantially constant angle down to the cone of silence of the beacon 4 at the near end of the runway. Such a path is of hyperbolic form and is indicated by dotted line 26 in Fig. 4. Up to the edge of the cone of silence of beacon 4 (marked X), it defines the glide angle at which the aircraft should approach the runway. At points on the glide path 26, the phase difference between the signals from beacons 3 and 4 is constant and therefore the amplitude of oscillations produced by the vertical oscillator is also constant. At points above and below the glide path, the phase difference respectively increases and decreases and causes a corresponding increase and decrease in the amplitude of the oscillations produced by the vertical oscillator.

These relations are shown in the lower portion of Fig. 4 where line 27 represents the signal from beacon 3 (i. e., output of receiver 19); line 28 represents the signal from beacon 4 (i. e., output of receiver 20); line 29 represents the output of mixer 21; line 30 represents the output of clipper 22; line 31 represents the positive bias from detector 23; and line 32 represents the visual image on the viewing screen of the cathode ray tube. Since the aircraft under the conditions of Fig. 4 is in line with the runway, the amplitude of the horizontal oscillator is zero and the trace on the screen of the cathode ray tube is a vertical line which varies in length with the elevation angle between the runway and a line of sight from the aircraft to the beacon 4 at the near end of the runway. To approach the runway at the proper glide angle (an angle which varies with the type of aircraft) the pilot steers the aircraft until it is in line with the runway and adjusts the angle of flight so as to maintain a constant vertical deflection upon the screen of the cathode ray tube. The vertical deflection is symmetrical about the center of the screen and a mark 33 may be placed on the screen to indicate the deflection corresponding to the proper glide angle. In case a head or tail wind is blowing, the pilot may be instructed to change the setting of mark 33 in order to land his aircraft at its proper approach angle for the special wind condition.

It will be observed that the indications illustrated in Fig. 4 correspond exactly with the view of the landing strip which the pilot would have were it possible for him to view the landing strip visually through a window in a craft approaching on the line of the runway. That is, were he on this line at a distance from the landing field and on the ground he would only see the end of the runway, i. e. a spot, in a view which he sees from the window of the craft. On the cathode ray tube this is indicated by an illuminated spot. At some low elevation above the ground, as that indicated by the legend "Below" in Fig. 4, the landing strip appear to one viewing it from the approaching craft as a spot elongated in the vertical direction. This is represented by the vertical elongation of the spot which appears on the viewing screen of the cathode ray device as shown in the right-hand circle of Fig. 4. At still higher altitudes the landing strip, as viewed from the window of the craft, appears as a corresponding longer spot. This is indicated on the viewing screen by the correspondingly longer vertical luminous spot indicated in the center and left-hand circle of Fig. 3.

The pilot approaching the landing strip on a line with it observes the vertical elongation of this luminous spot on the viewing screen until the lower end of the spot coincides with the mark 33. This tells him that he is on the glide path 26 and may start his glide to a landing.

When the aircraft is in line with the runway, the changes in relative phase in the signals from the beacons 3 and 4 determine the elevation angle between the runway and a line of sight from the aircraft to the near end of the runway. When the aircraft is off line, the relative change in phase of the signals from the beacons 3 and 4 is insufficient to determine the position of the aircraft. For example, at any point in a vertical plane passing through the beacons 1 and 2, the signals from the beacons 3 and 4 arrive unchanged in relative phase and are accordingly useless in determining the elevation angle between the aircraft and the runway. However, when the aircraft is off line, the relative phase displacement of the signals from the beacons 1 and 2 produces a series of pulses from clipper 9 whose widths are proportional to the angle between a line from the aircraft to a point midway between beacons 1 and 2 and a vertical plane passing through beacons 3 and 4. A negative bias applied to the vertical oscillator 24 proportional to the angle the aircraft is off line would correct for the apparent error in the elevation angle of the aircraft obtained solely from the signals of the beacons 3 and 4. In the present construction the output of the clipper 9 is fed through a detector 34 (Fig. 5) in which the signals from the clipper are integrated to obtain a negative bias applied to the vertical oscillator in opposition to the positive bias in the detector 23.

The operation is illustrated in Fig. 3 where, at the designated points, line 35 represents the signal arriving at the aircraft from beacon 3 (i. e., output of receiver 20); line 36 represents the signal from the beacon 4 (i. e., output of receiver 20); line 37 represents the output of mixer 21; line 38 represents the output of clipper 22; line 39 represents the positive bias obtained from detector 23; line 40 represents the opposing negative bias obtained from detector 34 when the aircraft is off line; and line 40a represents the voltage of the vertical oscillator 24.

Owing to this operation the length of the mark on the viewing screen indicates the angle of elevation of the craft from the beacon only when the craft is on the true course and it does not indicate the angle of elevation when he is off the true course, that is, it does not indicate the angle of elevation to a craft passing near the landing field but not on the course. As the craft departs from the course at right angles to it, for example, the phase relation between pulses from beacons 3 and 4 tends to lengthen the luminous line seen on the screen. At the same time, however, the increasing negative bias from detector 34 tends to reduce the amplitude of oscillation of vertical oscillator 24 thereby preventing such lengthing of the line visible on the screen.

Of course, the pilot of a craft off the true course is informed of that fact by the angle and direction of incline of the luminous line as will presently appear.

When the craft is on the true course, the horizontal oscillator 11 is inoperative and the length of the line produced on the screen is varied to correspond to the altitude of the craft by controlling the amplitude of oscillation of the vertical oscillator 24.

It is also desired to impart to this luminous line a slope on the viewing screen in the same direction that the landing strip would have in the view seen by the pilot looking through a window in the craft. That is, if the craft were approaching the landing field from position D, or B, as indicated in Fig. 1 and the landing strip were visible to the pilot looking through a window in the craft, it would appear as a line extending diagonally upward from the left side. It is desirable therefore that the luminous line on the screen of the cathode ray device also extend diagonally upward from the lower left portion of the viewing screen. To accomplish this the vertical and horizontal oscillators must be so synchronized that the beam is simultaneously deflected upward and to the right across the screen. This means that the vertical and horizontal oscillators should be in phase. They may, therefore, both be synchronized by the pulses from one of the beacons, as for example the beacon 3.

If the craft were approaching the field from directions A or C and the landing strip were visible to the eye of the pilot looking through a window of the craft it would appear as a line sloping diagonally upward from the right. It is desired, therefore, that the luminous line on the viewing screen have this same slope. All that is required to produce this slope is to reverse the phase of one of the oscillators, for example, the horizontal oscillator 11. The means for effecting these operations are indicated at 42 to 46 in the diagram and their operation will now be more fully explained.

From the apparatus thus far described, the amplitude of the horizontal sweep circuit oscillator 11 is proportional to the angle the approaching aircraft is off line, and the amplitude of the vertical sweep circuit oscillator 24 is proportional to the elevation angle between the runway and a line of sight from the aircraft to the near end of the runway. To obtain a trace on the viewing screen of the cathode ray tube having an angular position corresponding to the perspective position of the runway as viewed from the aircraft, it is necessary that the horizontal and vertical oscillators be synchronized as above explained, in the proper phase relation, that is, either in phase or in opposite phase. In the present apparatus, the vertical oscillator is synchronized by the signal received from beacon 3, and the horizontal oscillator is synchronized from beacon 3 through a mixer 42. Pulses received from beacon 3 are supplied from receiver 19 to mixer 42 both directly and through an amplifier and phase inverter 43. When the signal supplied from the amplifier and phase inverter 43 is less than the signal obtained directly from the beacon 3, the horizontal oscillator is synchronized in phase with the vertical oscillator as shown in the B and D columns in Fig. 3. When the signal from the amplifier 43 is greater than the signal obtained directly from the beacon 3, the horizontal oscillator is synchronized 180° out of phase with the vertical oscillator as shown in the A and C columns in Fig. 3.

The relative phase of the horizontal oscillator is controlled by controlling the gain of the amplifer 43 in accordance with the signals obtained from beacons 1 and 3. The signals from beacons 1 and 3 are fed from the receivers 6 and 19 through a mixer 44 in which the signals are added, through a clipper 45 in which the lower half of the mixed signal is removed, to a detector 46 in which the output of the clipper 45 is integrated to obtain a positive bias controlling the gain of the amplifier 43. The operation is illustrated in Fig. 3 for the designated points where line 47 represents the output of the mixer 44; line 48 represents the output of the clipper 45; line 49 represents the output of the detector 46; line 50 represents the output of the amplifier 43; and line 51 represents the output of the mixer 42. At points A and C, points equidistant from the beacons 1 and 3, the signals from the beacons arrive in unchanged relative phase and accordingly add in the mixer 44 and provide a maximum positive bias for the amplifier 43. The output from the amplifier 43, shown in line 50, accordingly exceeds the output of the receiver 19, and the output of the mixer 42 is therefore 180° out of phase with the signal from beacon 3. At points A and C the horizontal oscillator is synchronized 180° out of phase with the vertical oscillator. At points B and D, which are substantially in the plane of the beacons 1 and 3, the phase displacement of the signals received from beacons 1 and 3 is a maximum. The output of the mixer 44 is accordingly much smaller than at points A and C, and the positive bias obtained from the detector 46 is insufficient to cause any amplification in the amplifier 43. At these points the output of the mixer 42 which synchronizes the horizontal oscillator consists solely of the signal from beacon 3 and the horizontal oscillator is in phase with the vertical oscillator. At points in the plane of beacons 3 and 4 and in the plane of beacons 1 and 2, the relative phase displacement of the signals from bacons 1 and 3 is substantially equal and produces a positive bias from the output of detector 46 sufficient to cause the output of the amplifier 43 to be equal to the output of the receiver 19. At these points there will be no synchronizing of the horizontal oscillator although on either side of these points there will be a synchronizing impulse which will have its phase determined by the nearer of the points A, B, C, or D. When the aircraft is in the plane of the beacons 3 and 4, the amplitude of the horizontal oscillator is zero since the aircraft is in line with the runway, and the fact that there is no synchronizing of the horizontal oscillator is immaterial. The luminous line is then vertical as desired. When the aircraft is in the plane of the beacons 1 and 2, the amplitude of the vertical oscillator is zero so that the fact that there is no synchronizing of the horizontal oscillator is also immaterial. The luminous line is then horizontal, as is desired. At all other points where the horizontal and vertical oscillators have amplitudes determined by the position of the aircraft, the synchronizing of the horizontal and vertical oscillators is such as to produce the proper slope of the trace on the viewing screen of the cathode ray tube.

In order that the pilot may know the landing direction, it is desirable that one end of the representation of the runway on the viewing screen of the cathode ray tube be identified. In the present apparatus the identifying mark is obtained by connecting the output of the clipper 22 to the grid 52 of the cathode ray tube. This causes a bright spot on the representation of the runway at the near end when the aircraft is approaching the runway from the proper direction and at the far end when the aircraft is approaching from the opposite direction. This is shown in Fig. 3 where at points C and D the bright spot is at the lower end of the runway representation which corresponds to the near end of the runway, and at points A and B the bright spot is at the upper end of the runway representation which corresponds to the far end of the runway.

When the aircraft passes over beacon 4 (the point indicated at X in Fig. 4) the glide path 26 has an abrupt change of curvature leading into the ground. At point X an indicator lamp 53 warns the pilot that a landing is imminent. The lamp is energized from a circuit in series with a normally open relay 54 which picks up on a signal from beacon 3 through receiver 19 and a normally closed relay 55 which picks up by a signal from beacon 4 through receiver 20. At point X, since no signal is being received from beacon 4, relay 55 momentarily drops out and flashes indicator lamp 53. At this point, since no signal is being received from beacon 4, the output of the clipper 22 drops to zero and the lack of positive bias from the detector 23 causes the amplitude of the vertical oscillator to drop to zero. At the lighting of the indicator lamp 53 the trace of the cathode ray tube screen decreases, providing another indication to the pilot of his position relative to the runway. As the aircraft passes the cone of silence of the beacon 4, the signals from the beacons 3 and 4 become more in phase, causing a maximum positive b as on the vertical oscillator which increases the length of the trace on the viewing screen. The pilot is apprised of his position by both the lighting of the indicator lamp 53 and the sudden fluctuation in the length of the trace on the viewing screen. At this point the pilot is within landing distance of the runway and has the full length of the runway in which to make a landing. Lateral control is maintained during the entire landing operation since horizontal oscillator 11 is still controlled by beacons 1 and 2.

In the use of the apparatus, as the aircraft approaches within a few miles of the airport, a trace appears on the receiving screen of the cathode ray tube representing the appearance of the runway. The bright spot at one end of the trace indicates the end of the runway which should be approached for landing. The pilot continues level flight until the trace increases in size sufficiently to touch the marker 33. At this point the aircraft intersects a path leading to the near end of the runway having an elevation angle equal to the glide angle of the aircraft. If the trace is maintained tangent to the marker 33, the aircraft will come to within landing distance of the runway almost exactly at the proper glide angle. When a point on the glide path directly over beacon 4 is reached, the landing indicator flashes on and shortly thereafter the trace suddenly increases in length. From this the pilot knows exactly where he is, and has the entire length of the runway in which to "feel" his way to the ground.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States, is:

1. In an aircraft landing system, a pair of beacons spaced apart along the length of the runway and modulated with periodic signals having a period equal to twice the time of travel of a radio wave through the distance said beacons are spaced apart whereby the signals arriving at an aircraft are unchanged in relative phase at a point in a median plane perpendicular to the plane of the beacons and at other points are changed in relative phase in accordance with the distances from the aircraft to the respective beacons, means tending to produce an indication of the change in relative phase of the signals from said beacons, a pair of beacons centered on opposite sides of the runway in a plane perpendicular to the plane of said first beacon and modulated with signals of said frequency whereby the signals from said second beacons arrive at an aircraft in the plane of said first beacons unchanged in phase, and at points outside said plane are changed in relative phase, and means responsive to the changes in relative phase of signals arriving at an aircraft from said second beacons for decreasing said indication whereby said indication is proportional to the elevation angle between the runway and the aircraft.

2. In an aircraft landing system, a pair of beacons in a plane perpendicular to the length of the runway, means responsive to the change in relative phase of the signals arriving at an aircraft from said beacons for producing an indication of the angle the aircraft is off line, a pair of beacons in a plane parallel to the length of the runway, means responsive to the change in relative phase of the signals arriving at the aircraft from said second beacons for producing an indication of the apparent length of the runway along a line of sight from the aircraft which is correct in the plane of said second beacons, and means responsive to the change in relative phase of the signals arriving at the aircraft from said first beacons for decreasing said indication of the apparent length of the runway to correct for the error in the indication of the apparent length of the runway due to the angle the aircraft is off line.

3. In an aircraft landing system, a cathode ray tube having synchronized vertical and horizontal sweep circuit oscillators, means for varying the amplitude of the horizontal oscillator in accordance with the angle an aircraft is off line of the runway, means for varying the amplitude of the vertical oscillator in accordance with the elevation angle of the aircraft as viewed from the runway, and means for varying the relative polarity of the horizontal and vertical oscillators as the position of the runway from the point of view of the aircraft varies from right to left, whereby the trace produced on the cathode ray tube screen corresponds to the perspective of the runway from the aircraft.

4. Apparatus for reproducing a perspective of runway from the point of view of an aircraft, comprising a pair of non-directional beacons at opposite sides of the runway, a pair of non-directional beacons at opposite ends of the runway, said pairs of beacons radiating signals modulated in a predetermined relative phase whereby the signals arriving at the aircraft from the respective beacons deviate from said relative phase in accordance with the distance from the aircraft, a cathode ray tube having synchronized horizontal and vertical sweep circuits, means cooperating with the horizontal sweep circuit for producing a horizontal deflection proportional to the deviation from said relative phase of the signals arriving at the aircraft from the beacons on opposite sides of the runway whereby the magnitude of the horizontal deflection is an indication of the amount the aircraft is off line of the runway, means cooperating with the vertical sweep circuit for producing a vertical deflection proportional to the deviation from said relative phase of the signals arriving at the aircraft from the beacons at opposite ends of the runway, and means cooperating with said vertical sweep circuit for diminishing the vertical deflection in accordance with the amount the aircraft is off line of the runway.

5. In an aircraft landing system, beacons at the near and far ends of the runway from the point of view of an aircraft approaching from the proper landing direction, a cathode ray tube, means responsive to the peaks of the sum of the signals arriving at an aircraft from said beacons for modulating the beam of the cathode ray tube whereby the beam modulation has a predetermined phase relative to the signal from the beacon more remote from the approaching aircraft, a sweep circuit for producing a trace on the screen of the cathode ray tube representing a line connecting said beacons, and means synchronizing the sweep circuit with the signal from one of said beacons whereby the position of said beam modulation on said trace bears a predetermined relation to the position of said one beacon as viewed from the aircraft.

6. The combination, in a system for guiding aircraft to a landing strip, of a beacon near said strip, a viewing screen on the craft to be landed, means to produce a line on said screen representing said landing strip, means controlled by said beacon to vary the slope and direction of slope of said line to agree with the appearance of said strip if viewed by the eye from a forward window of said craft as it approaches said strip from any direction, and means to mark the end of said line corresponding to a predetermined end of said strip.

7. The combination, in a system for guiding aircraft to a landing strip, of a beacon near said strip, a viewing screen on the craft to be landed, means to produce a line on said screen representing said landing strip, and means controlled by said beacon to vary the slope and direction of slope of said line to agree with the appearance of said strip if viewed by the eye from a forward window of said craft as it approaches said strip from any direction whereby said line is vertical when the craft approaches said strip from the direction in which said strip extends and means to vary the length of said line as said craft approaches said strip from said direction.

8. In an indicating system for guiding aircraft in landing on a landing strip, the combination of a pair of beacons located along said strip, said beacons transmitting waves of constant frequency and phase relation, a cathode ray device carried by an aircraft having a viewing screen, means to deflect the ray of said cathode ray device in one direction only when said craft is on a course in line with said beacon thereby to produce a line on said screen, and means controlled by the phase relation between said waves transmitted by said beacons as received on said craft to lengthen said line from a minimum length when the craft is at ground level to a maximum length when said craft is at high elevation angle from said strip.

9. In an indicating system for guiding airraft to a landing on a landing strip, of a pair of beacons located along said strip each transmitting oscillations having a frequency equal to one divided by twice the time required for a radio wave to travel from one of said beacons to the other whereby said waves are received on an aircraft in line with said beacons at ground level in one phase relation and at a position high over said beacons in said line in a different phase relation, and a cathode ray device having a viewing screen, means to deflect the ray of said device in a predetermined direction to produce a line on said screen representing said landing strip, and means responsive to variation in said phase relation to change the length of said line from a minimum corresponding to ground level to a maximum corresponding to high angular elevation with respect to said strip.

10. In an indicating system for guiding aircraft to a landing on a landing strip, of a pair of beacons located along said strip each transmitting oscillations having a frequency equal to one divided by twice the time required for a radio wave to travel from one of said beacons to the other whereby said waves are received on an aircraft in line with said beacons at ground level in one phase relation and at a position high over said beacons in said line in a different phase relation, a cathode ray device having a viewing screen, means to deflect the ray of said device in a predetermined direction to produce a line on said screen representing said landing strip, means responsive to variation in said phase relation to change the length of said line from a minimum corresponding to ground level to a maximum corresponding to high angular elevation from said strip, and means to prevent variation in length of said line in response to variation in said phase relation due to movement of the craft to positions off of the line of said beacons.

11. The combination, in a system for guiding aircraft to a landing area, of four radiators located at the corners of a polygon including said area, said radiators all transmitting waves of the same frequency and having predetermined phase relations, a cathode ray device carried by an aircraft having a viewing screen, vertical and horizontal deflecting means for said cathode ray device operating synchronously, means responsive to the phase relation between said waves received from one pair of said beacons spaced diagonally across said polygon to control one of said deflecting means, means responsive to the phase relation between said waves received from the other pair of said radiators to control the other deflecting means, said last two means each including means to produce zero deflection when the craft is in line with a corresponding one of said pairs of beacons and maximum deflection when the craft is in line with the other of said pairs of beacons, whereby a line is produced on said screen varying in slope in accord with variations in said phase relations throughout the complete horizon about said landing area.

12. The combination, in a system for guiding aircraft to a landing area, of four radiators located at the corners of a polygon including said area, said radiators all transmitting waves of the same frequency and having predetermined phase relations, a cathode ray device carried by an aircraft having a viewing screen, vertical and horizontal deflecting means for said cathode ray device operating synchronously, means responsive to the phase relation between said waves received from one pair of said beacons spaced diagonally across said polygon to control one of said deflecting means, means responsive to the phase relation between said waves received from the other pair of said radiators to control the other deflecting means, said last two means each including means to produce zero deflection when the craft is in line with a corresponding one of said pairs of beacons and maximum deflection when the craft is in line with the other of said pairs of beacons, whereby a line is produced on said screen varying in slope in accord with variations in said phase relations throughout the complete horizon about said landing area, and means to reverse the phase relation between said two deflecting means in passing from each quadrant to the next about said landing area.

13. The combination in a system for guiding aircraft to a landing strip, a radio beacon at said strip, a cathode ray device having a viewing screen carried by the craft to be landed, vertical and horizontal deflecting means for said cathode ray device, means including said beacon to control said deflecting means to produce a line on said screen having a slope agreeing with the slope that said strip would have in the view to the eye from said aircraft whereby said line is vertical when the craft approaches from the direction in which said strip extends and has opposite slopes when the craft approaches from angles to right or left of said direction.

14. The combination, in a system for guiding aircraft to a landing strip, of a beacon comprising two pair of radiators about said strip, each pair comprising radiators on a line intersecting a line between the other pair, and all of said radiators radiating carrier waves modulated at the same frequency, equipment to be carried by an aircraft comprising a cathode ray device having a viewing screen, horizontal and vertical deflecting means therefor, means to synchronize said deflecting means with said common frequency, means responsive to the phase relation between currents of said frequency received from each pair of said beacons to vary the magnitude of deflection produced by the corresponding one of said deflecting means, and means to reverse the phase relation between the operation of said deflecting means when the craft crosses either of said lines.

15. The combination, in a system for guiding aircraft to a landing strip, of a beacon comprising two pair of radiators about said strip, each pair comprising radiators on a line intersecting a line between the other pair and all of said radiators radiating carrier waves modulated at the same frequency, equipment to be carried by an aircraft comprising a cathode ray device having a viewing screen, horizontal and vertical deflecting means therefor, means to synchronize said deflecting means with said common frequency, means responsive to the phase relation between currents of said frequency received from each pair of said beacons to vary the magnitude of deflection produced by the corresponding one of said deflecting means from minimum when the craft is in line with one pair of radiators to maximum when it is in line with the other pair of radiators, means to reverse the phase relation between the operation of said deflecting means when the craft crosses either of said lines, and means operable when the deflection produced by one of said deflecting means is minimum to increase the magnitude of deflection produced by the other deflecting means as the craft approaches said landing strip in level flight.

16. The combination, in a system for guiding aircraft to a landing area, four pulse radiators positioned about said area at the corners of a polygon, one pair of diagonally oppositely disposed radiators radiating pulses in phase and the other pair radiating pulses of the same frequency in opposite phase, the distance between said radiators being such that pulses received from said first pair at a distant point in line therewith are received out of phase and pulses received from said second pair of radiators at a distant point in line therewith are received in phase, means carried by an aircraft to receive the pulses from each pair of radiators and to produce a unidirectional voltage of magnitude dependent on the phase relation therebetween, a cathode ray device having horizontal and vertical deflecting means operating at the frequency of said pulses, and means to vary the magnitude of deflection produced by each of said deflecting means in accord with the magnitude of a corresponding one of said unidirectional voltages.

17. The combination, in a system for guiding aircraft to a landing area, four pulse radiators positioned about said area at the corners of a polygon, one pair of diagonally oppositely disposed radiators radiating pulses in phase and the other pair radiating pulses of the same frequency in opposite phase, the distance between said radiators being such that pulses received from said first pair at a distant point in line therewith are received out of phase and pulses received from said second pair of radiators at a distant point in line therewith are received in phase, means carried by an aircraft to receive the pulses from each pair of radiators and to produce a unidirectional voltage of magnitude dependent on the phase relation therebetween, a cathode ray device having horizontal and vertical deflecting means operating at the frequency of said pulses, means to vary the magnitude of deflection produced by each of said deflecting means in accord with the magnitude of a corresponding one of said unidirectional voltages, and means to reverse the phase of one of said deflecting means in response to movement of the craft across the line of either pair of radiators.

JOHN W. DOWNIE.

REFERENCES CITED

The following references are of record in the file of this patent:

UNITED STATES PATENTS

| Number | Name | Date |
| --- | --- | --- |
| 2,116,667 | Chireix | May 10, 1938 |
| 2,280,126 | Metcalf | Apr. 21, 1942 |
| 2,144,203 | Shanklin | Jan. 17, 1939 |
| 2,198,113 | Holmes | Apr. 23, 1940 |

FOREIGN PATENTS

| Number | Country | Date |
| --- | --- | --- |
| 115,055 | Australia | Apr. 23, 1942 |